May 12, 1964
A. N. GREENWOOD ETAL
3,133,209
SWITCHING CIRCUIT UTILIZING TWO SILICON
CONTROLLED RECTIFIERS WITH TRANSIENT
PROTECTION FOR THE RECTIFIERS
Filed May 14, 1962
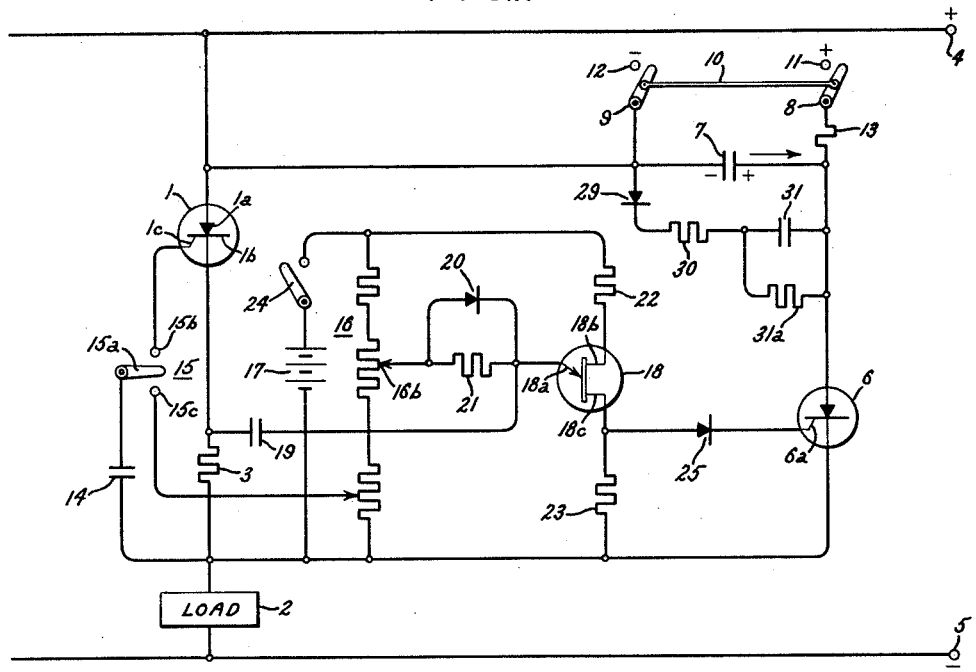
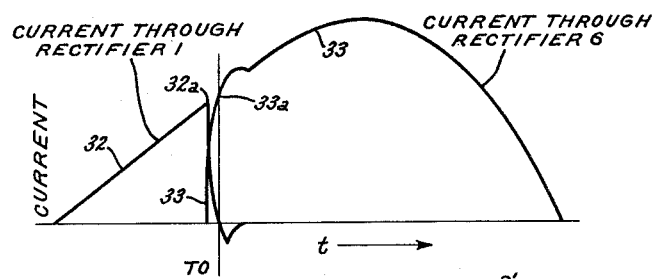
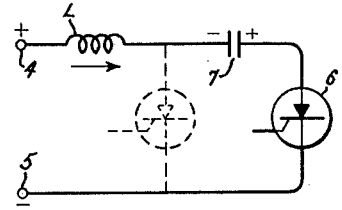
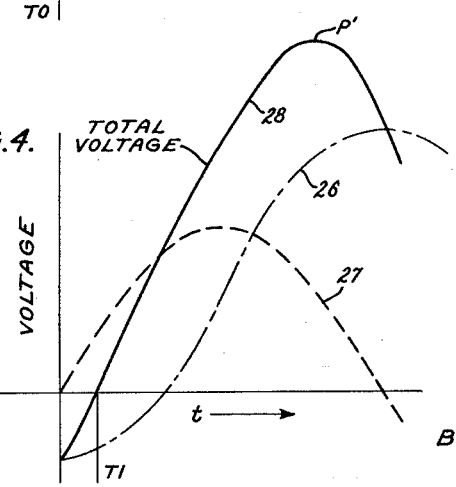
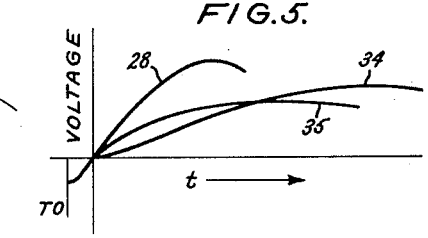
INVENTORS:
ALLAN N. GREENWOOD,
THOMAS H. LEE,
BY Irving H. Marshman
ATTORNEY.

United States Patent Office 3,133,209
Patented May 12, 1964

3,133,209
SWITCHING CIRCUIT UTILIZING TWO SILICON CONTROLLED RECTIFIERS WITH TRANSIENT PROTECTION FOR THE RECTIFIERS
Allan N. Greenwood and Thomas H. Lee, Media, Pa., assignors to General Electric Company, a corporation of New York
Filed May 14, 1962, Ser. No. 194,327
9 Claims. (Cl. 307—88.5)

This invention relates to static switching devices and more particularly to static switching devices which have no current carrying moving parts and which are capable of providing overload current protection within microseconds after sensing an overload condition, and it has for an object the provision of a simple, reliable, improved and inexpensive switching device of this character.

A silicon controlled rectifier, inasmuch as it has two stable states, one conducting and one blocking can be used as a switching device. With appropriate auxiliary circuitry such a device can be used as a circuit breaker. When the silicon controlled rectifier is used as a circuit breaker, current is supplied to the load from the source through its main conducting electrodes, i.e., its anode and its cathode in response to the supply of a firing pulse to an input circuit in which its gate electrode is included. Connected in a loop circuit with this device is a second silicon controlled rectfier and a pre-charged capacitor. In the event that a fault occurs in the circuit protected by the first silicon controlled rectifier, the current through the main current conducting electrodes is reduced to zero in very short order, i.e., within a few microseconds or less by gating the second silicon controlled rectifier to cause the precharged capacitor to force current around the local circuit in a direction and in an amount to reduce the current through the first silicon controlled rectifier to zero. Subsequently, the second silicon controlled rectifier is switched from the conducting mode to the blocking mode. When the silicon controlled rectifiers switch from their conducting to their blocking modes at the incidence of their respective current zeroes, voltage transients are initiated in the circuit. If the apparatus is to function successfully as a circuit breaker, the controlled rectifiers must be able to support to the transient surge voltages in both the forward and reverse direction to which the circuit subjects them without breaking down and commencing to conduct again and accordingly, a more specific object of this invention is the provision of means for limiting the transient surge voltages that inevitably occur to a value that will make it possible to realize the maximum interrupting performance obtainable from the current and voltage ratings of the controlled rectifiers employed in the breaker.

In carrying the invention into effect in one form thereof, a first controlled rectifier is provided, that is adapted to be connected in circuit between a source and a load together with a quenching circuit in parallel therewith comprising a precharged capacitor and a second controlled rectifier in series relationship with each other. Gating the second controlled rectifier to force current from the precharged capacitor through the first controlled rectifier in a direction opposite to the normal flow reduces the current through the first rectifier to zero and enables it to regain its blocking state. The application of unacceptably high transient recovery voltages to the controlled rectifiers when switched to their blocking state is prevented by means of a branch circuit in parallel with the precharged capacitor comprising substantial amounts of resistance and capacitance which are provided by means of a resistor and an electrolytic capacitor connected in series relationship. In one form of the invention the capacitor is of the polarized type and included in series with it and the resistor is a diode rectifier connected so that it conducts during the forward transient recovery voltage applied to the first controlled rectifier. Alternatively, the capacitor may be of the nonpolarized type and in this form of the invention the diode rectifier is not included. In both forms of the invention, the series resistor may be omitted in the event that the equivalent series resistance of the capacitor itself provides sufficient resistance.

For a better and more complete understanding of the invention reference should now be had to the following specification and to the accompanying drawings in which:

FIG. 1 is a an elementary diagram of an embodiment of the invention,

FIG. 2 is a simple equivalent circuit of the power circuit of the FIG. 1 embodiment under certain operating conditions, and FIGS. 3, 4 and 5 are plots of characteristic curves that serve to facilitate an understanding of the invention and its operation.

Referring now to the drawings and particularly to FIG. 1 thereof, the static circuit breaker illustrated therein comprises a first silicon controlled rectifier 1 connected in series relationship with a load device 2 and a non-inductive low resistance shunt device 3 that develops a few volts across its terminals in response to the predetermined value of overload at which the breaker is to operate. The resistance of the shunt may be a small fraction of an ohm. This series circuit is connected across a pair of terminals 4 and 5 that are adapted to be connected across the output terminals of a suitable power source such as a 120 volt D.-C. supply. The control rectifier 1 is a PNPN semiconductor device having an anode 1a, a cathode 1b and a gate control element 1c. Conduction through the controlled rectifier is initiated by application to the gate circuit of a small control signal in the form of a firing pulse which causes avalanche breakdown of the center rectifying junction. This breakdown occurs at speeds approaching a microsecond. After breakdown the control gate element normally loses control over conduction through the rectifier so that it must be commutated or quenched in order to discontinue current flow through the device.

For the purpose of quenching or commutating controlled rectifier 1, a second controlled rectifier 6 is provided which may be identical with controlled rectifier 1. However, since it will be required to handle switching currents for only a short period, it may have a lower rating than rectifier 1. As previously mentioned, in order to discontinue current flow through the main load current carrying control rectifier 1 it is necessary that the current flow through this device be brought to zero, and subsequently have inverse voltage applied across the device for a period of time sufficient to allow the rectifier to regain its blocking state. For this purpose a quenching or commutating capacitor 7 is provided and is connected in a loop circuit with the first controlled rectifier 1 and the second controlled rectifier 6 so that a discharge path is provided for the commutating capacitor current in order to reduce the load current through the controlled rectifier 1 to zero. In order to obtain maximum current from capacitor 7 this loop circuit is designed to have minimum impedance. For this reason the loop inductance is kept very small and capacitor 7 is of a type that has low equivalent series resistance such, for example, as the well-known oil insulated paper capacitor so that the loop circuit is virtually undamped. The commutating capacitor is included in a precharging circuit that is illustrated as comprising input terminals 8 and 9 to which the terminals of the capacitor 7 are connected and which may in turn be connected by means of a switch 10 to a suitable source such as D.-C. power supply that is represented by positive terminal 11 and negative terminal 12. A suitable current limiting resistor 13 is included in the connections between switch 10 and capacitor 7. Upon closing the switch 10 capacitor 7 will be precharged to a voltage that is determined by the voltage of the source 11, 12 and has a polarity that is negative at the terminal of capacitor 7 that is connected to the anode 1a of controlled rectifier 1. For switching the controlled rectifier 1 from the blocking state to the conducting state, an ON triggering circuit is provided which is connected to the control gate element of the first controlled rectifier 1. Triggering is accomplished by discharging the previously charged capacitor 14, into the gate circuit of the first controlled rectifier 1, by means of the double throw switch 15. Any other suitable form of triggering means may, of course, be employed.

To discontinue current through the controlled rectifier 1 and load 2 in response to overload or fault current in excess of a predetermined value an OFF triggering circuit is provided. A suitable form of triggering means is illustrated as comprising a unijunction transistor 18 having its base to base circuit connected across a suitable source such as the battery 17 together with a capacitor 19 connected between the positive terminal of the overload responsive shunt 3 and the emitter element 18a of the transistor together with a biasing circuit comprising a parallel combination of diode 20 and resistor 21 connected between the emitter and the slider 16b on potentiometer 16. Resistors 22 and 23 are included in connections between the base elements 18b and 18c and the positive and negative terminals of the D.-C. source 17. A diode rectifier 25 is connected between the base element 18c and the gate element 6a of the second controlled rectifier 6.

The unijunction transistor 18 has fairly high impedance across the base elements 18b and 18c as long as the ratio of the voltage across the emitter 18a and base 18c to the voltage across the bases 18b and 18c is less than a predetermined value. If this critical value is exceeded, the transistor switches from its high impedance mode to its low impedance mode. The position of the slider 16b is adjusted to a point on the potentiometer 16 at which the transistor is biased to its high impedance mode. A sudden increase in the voltage across the shunt 3 such as produced by a fault current is transmitted through the coupling capacitor 18 and added to the bias voltage of transistor 18 thereby to cause it to switch from its high impedance mode to its low impedance mode. As a result of this, a gating pulse is applied to controlled rectifier 6 causing it to fire and discharge the precharged commutating capacitor 7. This action forces current from the capacitor 7 around the local circuit through the second controlled rectifier 6 and the first controlled rectifier 1 in the direction shown by the arrow. The consequence of this action is to reduce the current through the controlled rectifier 1 to zero in a very brief interval of time, e.g., a few microseconds or less.

After switchoff of controlled rectifier 1, in the static circuit breaker as described up to this point, intolerably high transient voltages could be generated across the rectifier 1. These could be of sufficient magnitude to cause the rectifier to break down, reestablish current into the fault and be destroyed. These overvoltages are caused by the combined action of two effects: the overshoot occurring when the source reverses the polarity of the charge on the capacitor 7, and the transfer to the capacitor of energy stored in the source and load inductances at the time the current through the controlled rectifier 1 is quenched. The character of such a transient overvoltage is graphically illustrated in FIG. 4 in which the curve 26 represents the voltage on the capacitor 7 produced by the polarity reversing action of the source and the curve 27 represents the quadrature voltage due to the transfer to the capacitor of inductively stored energy from the source. The curve 28 represents the sum or total voltage developed across the capacitor 7. This total voltage, except for small drops in controlled rectifier 6 and local impedance, appears across the controlled rectifier 1 and it could be many times the forward voltage rating of the rectifier. In the static circuit breaker thus far described this could lead to breakdown of the rectifier 1, re-establishment of the current through it into the fault and destruction of the rectifier. In order to prevent this and further in order to realize the maximum utility and economic value from the current and voltage ratings of the controlled rectifier, means are provided for preventing the application to the controlled rectifier of any such destructive surge voltages. These means are illustrated as a branch circuit in parallel with the commutating capacitor 7 and comprising a diode rectifier 29, a resistor 30 and an uncharged capacitor 31 all connected in series relationship with each other. A bleeder 31a is connected in parallel with capacitor 31. Capacitor 31 is of the electrolytic type. For equal ratings an electrolytic capacitor has an equivalent series resistance of the order of 100 times that of the oil insulated paper type capacitor.

The purpose of the branch circuit is to provide means of dissipating and storing the energy of the forward voltage transient in such a way that the overvoltage never exceeds the withstand capabilities of controlled rectifier 1. A second purpose is to reduce the amplitude of the subsequent voltage transient occurring across the second controlled rectifier 6 when that device switches off. The specific object is to achieve these ends with components of minimum cost, space and weight. The provision of the diode 29 makes it possible for capacitor 31 to be of the polarized electrolytic type. The diode is so connected as to conduct during the forward transient only, i.e., during the existence of forward recovery voltage across controlled rectifier 1. The effect of the invention is to divorce the switching-off or quenching function from the voltage limiting function. Capacitor 7 provides the former while capacitor 31 predominates in the latter. The use of an electrolytic-type capacitor for 31 in the transient recovery voltage limiting branch typically results in the following savings: volume 47:1; weight 66:1; cost 28:1. Furthermore, the electrolytic capacitor has much greater equivalent series resistance than does a paper capacitor. This is utilized in the branch circuit to damp the forward voltage transient by dissipating energy.

With the foregoing understanding of the elements and their organization, the operation of the static circuit breaker will readily be understood from the following description. It is assumed that the controlled rectifiers 1 and 6 are in the high impedance or blocking state and that the switches 10, 15 and 24 are in the open position in which they are illustrated. To place the breaker in readiness for operation, the switch 10 is moved to the closed position to connect the commutating capacitor 7 to the separate D.-C. charging source 11, 12 thereby to precharge the capacitor to the polarity indicated by + and − signs at its terminals. The switch 24 is closed to connect the biasing circuit of the unijunction transistor 18 to the source of D.-C. bias voltage 17. The movable contact 15a of switch 15 is moved into engagement with the stationary contact 15c to charge the capacitor 14.

To switch the main control rectifier 1 from the blocking to the conducting state, the movable contact 15a is moved into engagement with stationary contact 15b to complete the gate circuit of rectifier 1 and to cause the capacitor 14 to discharge and deliver a firing pulse to the gate circuit. In response to this firing pulse the controlled rectifier 1 is switched to its conducting state and current flows from the positive terminal 4 of the main source through the controlled rectifier 1, current sensing shunt 3 and load 2 to the negative terminal 5.

In the event of a severe overload or fault, the current through controlled rectifier 1 will rise rapidly in accordance with curve 32 in FIG. 3. At a predetermined value of fault current such as represented by point 32a of curve 32, the voltage across overload sensing device 3 will attain a value, which when transmitted through capacitor 19 to the emitter 18a of unijunction transistor 18 and added to the bias voltage, causes the transistor to switch from the non-conducting to the conducting state. In its conducting state, transistor 18 administers a firing pulse to the gate circuit of controlled rectifier 6. In response to this firing pulse controlled rectifier 6 is switched from its non-conducting state to its conducting state and the voltage of the precharged capacitor 7 is applied as an inverse voltage across controlled rectifier 1. The switching of controlled rectifier 6 to its conducting state discharges the precharged capacitor 7 around the local circuit including controlled rectifiers 6 and 1 in the direction shown by the arrow. The capacitor discharge current through the controlled rectifier 6 rises rapidly as illustrated graphically by the steeply rising portion of curve 33 in FIG. 3 and this results in simultaneously decreasing the current in controlled rectifier 1 as illustrated by the steeply declining portion of curve 32 between point 32a and T₀. At time T₀ the current in controlled rectifier 6 attains a value represented by point 33a equal to or greater than the value of current in controlled rectifier 1 at point 32a. The consequence of this action is to reduce the current in controlled rectifier 1 to zero at time T₀ as illustrated in FIG. 3. This occurs within a few microseconds of the instant at which the controlled rectifier 6 becomes conducting. Momentarily, the current through controlled rectifier 1 will reverse until the junction is cleaned out whereupon, for all practical purposes, rectifier 1 will become an open circuit so that the circuit from positive supply terminal 4 to the opposite terminal 5 reduces to the circuit shown in FIG. 2 in which L represents the inductance of the source. In this figure it is assumed that the load has been virtually short circuited by the fault. The current flowing in the circuit through the controlled rectifier 6 and through the fault back to the supply will discharge the capacitor 7 and then begin to charge it with the polarity of the supply. Capacitor 7 is chosen so that in conjunction with the local loop inductance it will have a residual charge of its original polarity at the time the current through controlled rectifier 1 is brought to zero. At this time T₀, the voltage at terminal 7a of capacitor 7 is still negative with respect to negative terminal 5 of the supply which means that inverse voltage will be applied to controlled rectifier 1. The charge on capacitor 7, at this time, must be sufficient to insure that inverse voltage remains applied for a long enough period for controlled rectifier 1 to turn off. At time T1 the transient voltage represented by curve 28 crosses the zero line and diode 29 begins to conduct. Current will now be diverted from the path through the commutating capacitor 7 and will flow through the resistor 30 and capacitor 31. As a result of this action, energy will be expended in the resistance of the branch circuit and stored in capacitor 31 so that the surge voltage on capacitor 7 will not rise to the high forward voltage peak represented by point P' of curve 28. On account of the expenditure and storage of energy in the branch circuit, the surge voltage, i.e., the recovery voltage across controlled rectifier 1 will rise much more gradually and will attain a much lower peak voltage as illustrated graphically in FIG. 5 in which curve 34 represents the recovery voltage across the controlled rectifier 1 that results when capacitor 31 has approximately three times the capacitance of the commutating capacitor 7. Curve 35 represents the recovery voltage when the resistance of resistor 30 has an optimum value. Optimum damping occurs when the resistance of the branch circuit is in the neighborhood of $$\sqrt{\frac{L}{C31}}$$

where L is the inductance of the fault current path through controlled rectifier 6.

Current zero occurs at a point shortly after the peak of the recovery voltage wave causing the controlled rectifier 6 to turn off and to initiate a new transient. However, the transient recovery voltage applied to the controlled rectifier 6 is also greatly reduced in amplitude and is more heavily damped than would be the case in the absence of the branch circuit 29, 30 and 31. Consequently the duty on controlled rectifier 6 is correspondingly reduced. In addition to storing and dissipating energy during the forward transient, capacitor 31 performs the additional function of preventing the establishment of a low resistance D.-C. path from one terminal of the supply source to the other through the damping resistor and controlled rectifier 6. This makes it possible for the current through controlled rectifier 6 to decay to zero. In this connection the maximum current that can flow through the bleeder 31a is less than the holding value necessary to maintain controlled rectifier 6 in the conducting state.

Capacitor 7 should have sufficient capacitance to provide the quenching current for controlled rectifier 1 and assure adequate time for turnoff. Capacitor 31 in combination with resistor 30 should be large enough to limit the subsequent recovery voltage transient to the desired low value. Thus to a large extent the two functions of quenching and surge protection are isolated from each other.

In a modification of the embodiment of the invention that is illustrated in FIG. 1 the polarized electrolytic capacitor 31 in the voltage limiting branch circuit is replaced by a nonpolarized electrolytic capacitor. Since a nonpolarized capacitor may be used with voltage of either polarity, the diode rectifier 29 may be omitted. The equivalent series resistance of both the polarized and the nonpolarized capacitor is so large that in some cases it provides sufficient resistance to make it possible to omit the series dissipating resistor 30. For equal capacitance ratings the equivalent series resistance of the polarized electrolytic capacitor is of the order of 100 times greater than that of an oil insulated paper type of capacitor and the equivalent series resistance of the nonpolarized capacitor is of the order of 200 times that of the oil insulated paper capacitor.

The invention may be utilized to protect A.-C. circuits by the addition of a simple bridge configuration of diodes around the static breaker, or by connecting two such static breakers in back to back configuration to the A.-C. circuit to be protected.

Although a specific embodiment of the invention has been illustrated and described it will be understood that the invention is not limited thereto since alterations and modifications will readily suggest themselves to persons skilled in the art without departing from the true spirit of the invention or from the scope of the annexed claims.

What we claim as new and desire to secure by Letters Patent of the United States is:

1. A static switching apparatus comprising:
    (a) first and second solid state controlled rectifiers each having an anode, a cathode and a gate control element,
    (b) said first rectifier being adapted to be connected in series circuit relationship with a load device across a source of electrical energy,
    (c) an ON triggering circuit coupled to the gate element of said first controlled rectifier for switching said first rectifier from its nonconducting to its conducting state,
    (d) a substantially undamped quenching circuit connected across said first controlled rectifier and comprising said second controlled rectifier and a commutating capacitor connected in series circuit relationship with each other, said second rectifier and said first rectifier being connected for conduction in the same direction with respect to said source,
    (e) means for precharging said capacitor in a polarity tending to produce forward voltage across said second controlled rectifier and inverse voltage across said first controlled rectifier, (f) an OFF triggering circuit for said first controlled rectifier comprising means for supplying an ON triggering signal to the gate element of said second rectifier, and (g) means for limiting the magnitude of the recovery voltage transient appearing across said first controlled rectifier when switched to its non-conducting state comprising a damped branch circuit shunting said commutating capacitor and including substantial amounts of resistance and capacitance.

2. The static switching apparatus as claimed in claim 1 wherein the resistance and capacitance of the branch circuit are provided by electrolytic capacitor having an equivalent series resistance of the order of 100 times the equivalent series resistance of an oil insulated capacitor of the same rating.

3. The static switching apparatus as claimed in claim 1 wherein the capacitance of said branch circuit is several times the capacitance of said commutating capacitor.

4. The static switching apparatus as claimed in claim 1 wherein the resistance of said branch circuit is in the neighborhood of $$\sqrt{\frac{L}{C}}$$

in which L is the inductance of the path of fault current through said second controlled rectifier and C is the capacitance of said branch circuit.

5. The static switching apparatus as claimed in claim 1 wherein the capacitance of said branch circuit is provided by a non-polarized electrolytic capacitor and wherein a substantial portion of the resistance of said branch circuit is provided by a resistor connected in series with said capacitor.

6. The static switching apparatus as claimed in claim 1 wherein means are provided for rendering said OFF triggering circuit for said first controlled rectifier responsive to an overload condition in the load circuit of said first controlled rectifier.

7. A static switching apparatus comprising:

(a) first and second solid state controlled rectifiers each having an anode, a cathode and a gate control element, (b) said first rectifier being adapted to be connected in series circuit relationship with a load device across a source of electrical energy, (c) an ON triggering circuit coupled to the gate element of said first controlled rectifier for switching said first rectifier from its nonconducting to its conducting state, (d) a substantially undamped quenching circuit connected across said first controlled rectifier and comprising said second controlled rectifier and a commutating capacitor connected in series circuit relationship with each other, said second rectifier and said first rectifier being connected for conduction in the same direction with respect to said source, (e) means for precharging said capacitor in a polarity tending to produce forward voltage across said second controlled rectifier and inverse voltage across said first controlled rectifier, (f) an OFF triggering circuit for said first controlled rectifier comprising means for supplying an ON triggering signal to the gate element of said second rectifier, and (g) means for limiting the magnitude of the recovery voltage transient appearing across said first controlled rectifier when switched to its non-conducting state comprising a branch circuit shunting said commutating capacitor comprising a resistor, an initially uncharged polarized electrolytic capacitor and a rectifier connected in series relationship.

8. The static switching apparatus as claimed in claim 7 wherein said commutating capacitor has relatively low equivalent series resistance and said electrolytic capacitor has relatively high equivalent series resistance.

9. The static switching apparatus as claimed in claim 7 wherein said electrolytic capacitor has an equivalent series resistance per microfarad of rating of the order of 100 times the equivalent series resistance per microfarad rating of the commutating capacitor.

No references cited.